(12) United States Patent
Candela

(10) Patent No.: US 7,030,767 B2
(45) Date of Patent: *Apr. 18, 2006

(54) WATER LEAK MITIGATION SYSTEM

(75) Inventor: Paul Joseph Candela, Clinton Township, MI (US)

(73) Assignee: Flo-Guard Water Leak Mitigation Systems, L.L.C., Clinton Township, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 10/771,665

(22) Filed: Feb. 4, 2004

(65) Prior Publication Data

US 2004/0155784 A1    Aug. 12, 2004

Related U.S. Application Data

(63) Continuation-in-part of application No. 10/216,984, filed on Aug. 12, 2002, now Pat. No. 6,812,848.

(51) Int. Cl.
    *G08B 21/00*    (2006.01)

(52) U.S. Cl. .................... 340/605; 340/603; 340/606; 137/79

(58) Field of Classification Search ................ 340/605, 340/603, 606; 137/79, 15, 11, 78.3, 624.12; 73/40
See application file for complete search history.

(56) References Cited

U.S. PATENT DOCUMENTS

| 4,730,637 | A | 3/1988 | White |
| 4,841,287 | A | 6/1989 | Flig et al. |
| 4,921,012 | A | 5/1990 | Bratten |

(Continued)
(Continued)

*Primary Examiner*—Anh V. La
(74) *Attorney, Agent, or Firm*—Harness, Dickey & Pierce, P.L.C.

(57) ABSTRACT

A liquid flow mitigation system comprising a systems interface, a liquid arresting mechanism operable to impede flow of a liquid, a control device operable to produce an input to the systems interface representing a request to impede flow of the liquid, and a liquid utilizing device operable to produce an input to the systems interface representing a request for liquid flow. The systems interface directs the liquid arresting mechanism to impede liquid flow when the systems interface is in receipt of an input from the control device. The systems interface directs the liquid arresting mechanism to permit liquid flow when the systems interface is in receipt of an input from the water utilizing device.

20 Claims, 2 Drawing Sheets

U.S. PATENT DOCUMENTS

| | | |
|---|---|---|
| 4,987,408 A | 1/1991 | Barron |
| 5,038,820 A | 8/1991 | Ames et al. |
| 5,086,385 A | 2/1992 | Launey et al. |
| 5,229,750 A | 7/1993 | Welch, Jr. et al. |
| 5,263,543 A | 11/1993 | Nigro |
| 5,267,587 A | 12/1993 | Brown |
| 5,331,619 A | 7/1994 | Barnum et al. |
| 5,428,347 A | 6/1995 | Barron |
| 5,541,575 A | 7/1996 | Virnich |
| 5,568,825 A | 10/1996 | Faulk |
| 5,655,561 A | 8/1997 | Wendel et al. |
| 5,662,135 A | 9/1997 | Oppmann et al. |
| 5,971,011 A | 10/1999 | Price |
| 6,039,124 A | 3/2000 | Bowman et al. |
| 6,059,439 A | 5/2000 | Besnard |
| 6,105,607 A | 8/2000 | Caise et al. |
| 6,144,993 A | 11/2000 | Fukunaga et al. |
| 6,147,613 A | 11/2000 | Doumit |
| 6,192,282 B1 | 2/2001 | Smith et al. |
| 6,237,618 B1 | 5/2001 | Kushner |
| 6,696,961 B1 * | 2/2004 | Uhler .......... 340/606 |
| 6,812,848 B1 * | 11/2004 | Candela .......... 340/605 |
| 6,892,751 B1 * | 5/2005 | Sanders .......... 137/312 |

* cited by examiner

WATER LEAK MITIGATION SYSTEM

CROSS-REFERENCE TO RELATED APPLICATIONS

This application is a continuation-in-part of U.S. patent application Ser. No. 10/216,984 filed on Aug. 12, 2002 and issued as U.S. Pat. No. 6,812,848 on Nov. 02, 2004. The disclosure of the above application is incorporated herein by reference.

FIELD OF THE INVENTION

The present invention relates to a system capable of controlling the flow of a liquid, such as water. In particular, the present invention relates to a control device capable of restricting water flow in response to an input generated by one or more systems or devices and removing the water flow restriction in response to an input generated by one or more systems or devices that utilize water during operation.

BACKGROUND OF THE INVENTION

Water leak detection and control devices capable of restricting water flow to a building in response to the detection of a particular condition, such as one or more water leaks, are known. Current water leak detection and control devices actively detect the presence of water leaks directly by sensing different water parameters or indirectly by monitoring the associated water system. Such detection devices actively sense water parameters or monitor the associated water system through the use of electronic, mechanical and/or electro-mechanical circuits, such as sensors, microprocessors, and drivers. The use of such active monitoring devices makes current water leak detection devices inherently complex and costly. Due to the complexity and cost of current water leak detection devices, their use is impractical in many applications. Moreover, these systems are limited either in the ability to protect the entire building, and/or in the ability to provide water flow for important building systems in the event of one or more water leaks. Thus, there is a need for a water leak mitigation device that provides complete protection from water leaks, is capable of reducing the possibility of water leaks, and enables water flow to important building systems without the use of costly and complex active monitoring devices.

In response to the detection of a water leak, current water leak detection devices entirely restrict water flow to the associated building. Consequently, building operations that utilize water to function become inoperable. Examples of building devices that utilize water include irrigation systems, sump pumps, baseboard heating systems, water softener systems, fire suppression systems, and central humidification systems. When these building devices are not operational, the building is negatively affected. Thus, there further exists a need for a device that restricts water flow when water is not necessary, but resumes water flow when water is needed for the operation of a device that utilizes water.

SUMMARY OF THE INVENTION

The present invention provides for a liquid flow mitigation system comprising a systems interface, a liquid arresting mechanism operable to impede flow of a liquid, a control device operable to produce an input to the systems interface representing a request to impede flow of the liquid, and a liquid utilizing device operable to produce an input to the systems interface representing a request for liquid flow. The systems interface directs the liquid arresting mechanism to impede liquid flow when the systems interface is in receipt of an input from the control device. The systems interface directs the liquid arresting mechanism to permit liquid flow when the systems interface is in receipt of an input from the water utilizing device.

The present invention further provides for a water flow mitigation system comprising a systems interface, a water regulation device operable to impede water flow and operable to notify the systems interface as to the position of the water regulation device, a control device operable to provide an input to the systems interface representative of a request to restrict water flow, and a water utilizing device operable to provide an input to the systems interface representative of a request for water flow. The systems interface commands the water regulation device to impede water flow when the systems interface is in receipt of an input from the control device. The systems interface commands the water regulation device to permit water flow when the systems interface is in receipt of an input from the water utilizing device. The water regulation device provides feedback to the systems interface concerning the position of the arresting mechanism.

The present invention further provides for a water flow mitigation method comprising transferring a water arresting command from a control device to a systems interface to request the systems interface to restrict water flow, setting a water flow regulation device to restrict water flow in response receipt of the water arresting command by the systems interface, transferring a water request command from a water utilizing device to the systems interface to request the systems interface to permit water flow, setting the water flow regulation device to permit water flow in response to receipt of the water request command by the systems interface, and providing feedback to a user concerning the position of the water flow regulation device through at least one of a visual indicator and the control device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
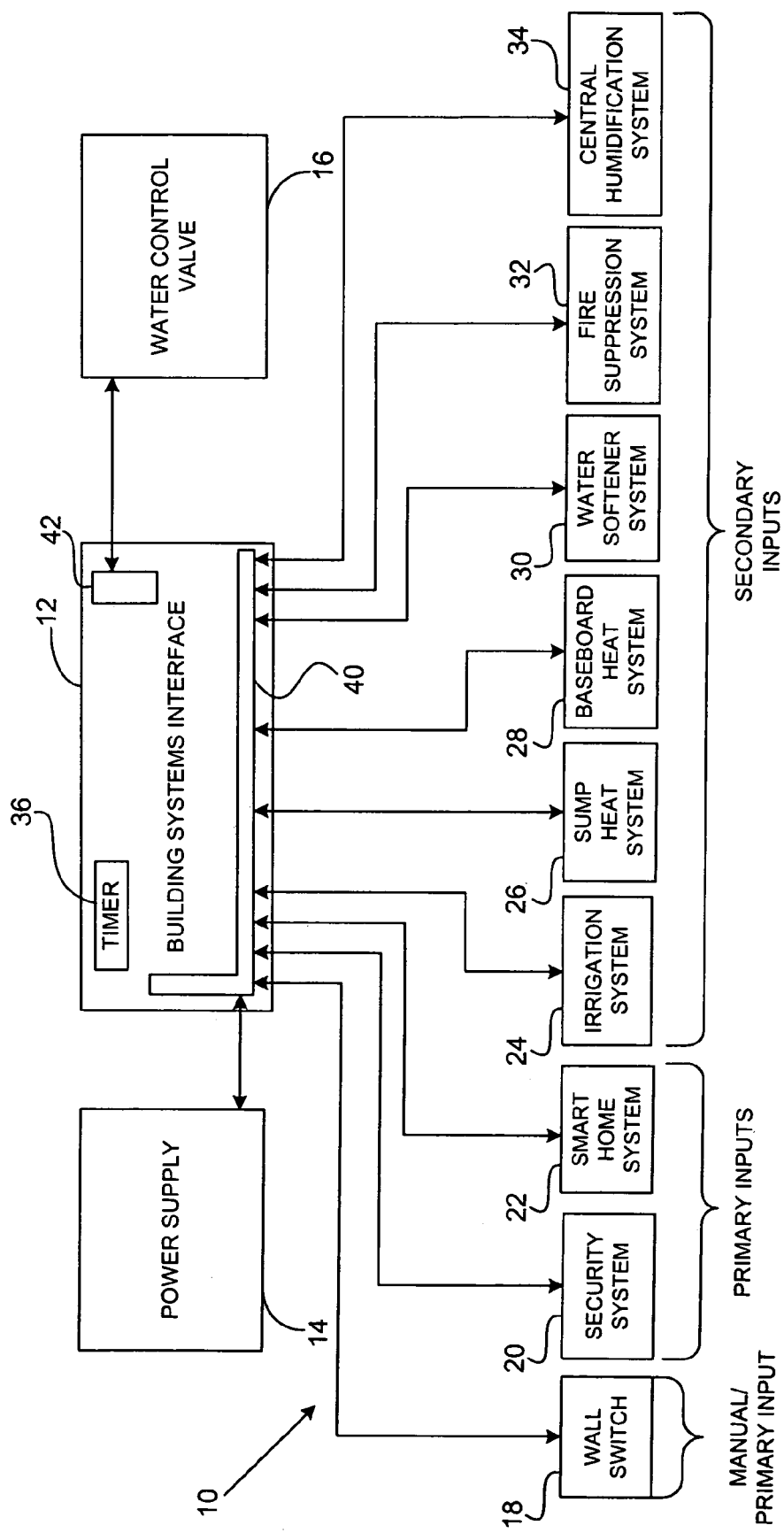
FIG. 1 is a block diagram showing the general components of the invention.

With reference to FIG. 1, a system for mitigating fluid leaks, such as water leaks for example, is shown at 10.

Specifically, the system 10 prevents the flow of water, such as to a building for example, when the system 10 is so set or a particular condition is detected, but resumes water flow when water is required to operate systems or devices that utilize water. The system 10 generally includes an interface, such as a building systems interface 12, a power supply 14, and a plumbing interface or liquid arresting device, such as a water control valve 16. The components of system 10 can be located within a building (not shown), but this is not a requirement. The components of the system 10 can be connected through wiring according to specifications known in the art to, for example, meet local building codes. The interface 12, power supply 14, and control valve 16 can be sized to the specifics of the particular application. These components of the system 10 are described in detail below.

The building systems interface 12 provides passive control of water flow to prevent unwanted water leaks. The control is passive in that the systems interface 12 does not monitor water parameters, such as water flow, water pressure, etc. Instead, the systems interface 12 provides a connection to numerous building systems that actively or intentionally control water flow.

The building systems interface 12 provides all electrical inputs and outputs for system 10. Systems interface 12 includes an input array for interface to external inputs such as, but not limited to, a manual wall switch 18, a security system 20, a smart building system 22, an irrigation system 24, a drainage/sump pump 26, a baseboard heating system 28, a water softener system 30, a fire suppression system 32, and a central humidification system 34. Inputs generated by control devices, such as the security system 20 and the smart home system 22, are generally classified as primary inputs. Inputs generated by devices utilizing water for operation, such as the irrigation system 24, the drainage/sump pump 26, the baseboard heating system 28, the water softener system 30, the fire suppression system 32, and the central humidification system 34 are generally classified as secondary inputs. Inputs generated by manual switch 18, which also acts as a control device, may be classified as either manual inputs or primary inputs depending upon the particular application. It must be understood that the primary and secondary inputs received by the systems interface 12 may include any one or all of the inputs described above. Further, additional primary and secondary inputs may be added to the system 10.

The system 10 can further include a timer 36. The timer 36 can be an adjustable timer and can be either integrated within the interface 12 or remotely connected to the interface 12. The timer 36 is operable to delay activation of the water control valve 16, a bypass 38 to deactivate the water control valve 16 (FIG. 2), an input array 40 for the power supply 14 and primary and secondary inputs, an output array 42 for interface to the water control valve 16, an enclosure (not shown), a visual annunciation of the active inputs and outputs in the form of a suitable annunciation device such as LEDs 75, 76, and 87 (FIG. 2), and mounting provisions (not shown).

Power supply 14 can be any suitable power supply capable of powering water control valve 16 and building systems interface 12. The transfer of voltage from the power supply 14 to water control valve 16 is controlled by systems interface 12 based on the primary, secondary, or manual inputs that interface 12 receives from the above described devices 18 through 34. Interface 12 also directs voltage produced by power supply 14 to external devices for feedback as inputs, as the result of the closure of switch or relay contacts.

Water control valve 16 can be any type of valve or arresting device operable to disrupt the flow of water to devices that utilize water, such as devices 24 through 34 described above. For example, the water control valve 16 can be a solenoid valve, a motorized ball valve, or a motorized gate valve. Regardless of the type of valve 16 used, the valve 16 can be sized to the specifics of the application. Further, the valve 16 can be located adjacent and posterior to a water meter (not shown). In some applications, when the valve 16 is not energized, the valve 16 remains closed to prevent water flow. When the water control valve 16 is energized, the valve 16 opens and permits water flow. However, it must be noted that this configuration can be reversed so that the valve 16 is open when not energized, thus permitting water flow.

Operation of the system 10 will now be described in detail below. System 10 may be operated manually using wall switch 18. Closure of switch 18 transfers a manual input to systems interface 12. Upon receipt of the manual input, systems interface 12 directs voltage from power supply 14 to control valve 16 to deenergize and close the valve 16. This closure of valve 16 prevents water flow to the building and/or select water utilizing devices, such as devices 24 through 34 described above. As long as system 10 is in receipt of the manual input generated by wall switch 18, the valve 16 remains closed and water is prevented from flowing to the building and/or the water utilizing devices 24 through 34. However, if systems interface 12 receives a secondary input from one or more of the water utilizing devices 24 through 34, water control valve 16 is opened to permit water flow to the building and/or to one or more of the water utilizing devices 24 through 34 to permit operation of one or more of the devices 24 through 34. As described above, the manual wall switch 18 may also be used as a primary input if so desired.

In addition to manually operating water control valve 16 using the wall switch 18, the water control valve 16 may be operated by systems interface 12 in response to primary inputs generated by one or more suitable active switching devices, such as security system 20 or smart home system 22. For example, security system 20 or smart home system 22 can be configured, such as being set in an "away" mode, so that when the building is vacated for extended periods of time, the respective devices 20 and 22 send a primary input to systems interface 12 notifying the interface 12 of the condition. Interface 12 then transfers voltage from power supply 14 to water control valve 16 to denergize and close the valve 16 and prevent water flow. Valve 16 remains closed as long as the interface 12 is in receipt of a primary input and not a secondary input from the water utilizing devices, such as the devices 24 through 34 described above.

Timer 36 may be used to delay the closure of valve 16 in response to the receipt of a primary input by systems interface 12. The use of timer 36 permits water flow to the building and/or water utilizing devices 24 through 34 for a set period of time before the water flow is restricted by systems interface 12 and valve 16. The timer 36 may be set by the user to any suitable time period. In one application, use of the timer 36 is advantageous because it permits water flow immediately following departure of the user from the building for devices or systems that require water, such as washing laundry, dishwashing, etc. The timer 36 may be any suitable timer known in the art.

Water flow previously interrupted due to the receipt of a primary input by systems interface 12 is restored upon the receipt of a secondary input by systems interface 12. For example, if a water utilizing device requires activation, such as devices 24 through 34, the water utilizing device sends a secondary input to systems interface 12. Upon receipt of the secondary input, systems interface 12 activates bypass 38 to open the water control valve 16, thereby permitting water flow to the building and/or to one or more of the water utilizing devices. The water control valve 16 remains open until the secondary input is eliminated. Once the secondary input is eliminated, the valve 16 closes and water flow is again interrupted unless another secondary input is received.

Figure 2:
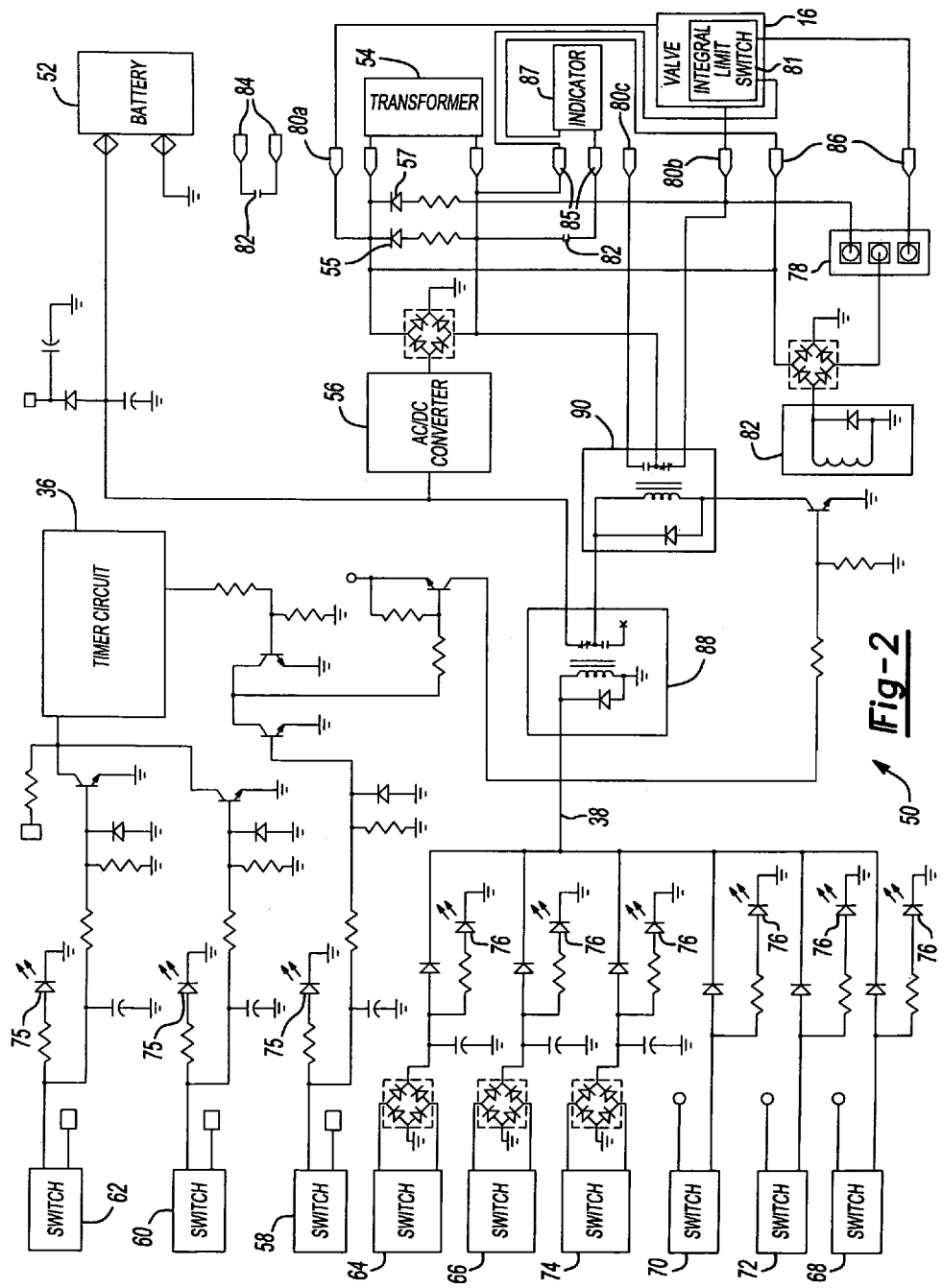
FIG. 2 is a circuit diagram of an exemplary circuit used in the operation of the invention.

A diagram of an exemplary circuit that can be used in the operation of system 10 is illustrated in FIG. 2 at 50. The circuit 50 can be powered by the power supply 14, which can take the form of a battery 52 or a transformer 54. The battery 52 can be used to power the system 10 independently of the transformer 54 to act as a back-up power source. The current supplied by the transformer 54 can be in the form of 24V AC current. However, any suitable voltage can be used and the circuit 50 can be equipped with an AC/DC converter 56 to provide DC current. An indicator, such as LED 55 can be used to indicate to a user that power is being received from the transformer 54. Another indicator, such as LED 57, can be used to indicate that power is being sent out to the valve 16.

The circuit 50 can further include a plurality of switches associated with the primary inputs 18 through 22 and the secondary inputs 24 through 34. In particular the circuit 50 can include primary switches 58 through 62 associated with primary inputs 18 through 22 respectively. Circuit 50 can further include secondary switches 64 through 74 associated with secondary inputs 24 through 34 respectively. Depending upon the secondary inputs and the particular application, the secondary switches 64 through 74 can be DC switches or AC switches and can use any suitable voltage, such as 24 volts. Both primary switches 58 through 62 and secondary switches 66 through 74 can include indicators, such as primary light emitting diodes (LED's) 75 and secondary LED's 76 to notify the user which switch is activated at a particular time. Further, as illustrated in FIG. 2 and as discussed above, the timer 36 can be used to delay transfer of signals produced by primary inputs 20 and 22 for a set period of time.

The circuit 50 can further include a jumper, such as a three position programmable jumper 78. The jumper 78 is operable to select and/or recognize the type of valve 16 used with the system 10. For example, the valve 16 may be at least one of a solenoid valve, a motorized ball valve, a motorized gate valve, etc. The valve 16 receives voltage inputs from the circuit 50 via terminals 80. Further, depending on the type of valve used, the valve 1.6 can include a switch, such as an integral limit switch 81 positioned within the valve. The integral limit switch 81 can provide feedback to the circuit 50 on the position of the valve 16, such as whether the valve 16 is open or closed. As illustrated, valves in the normally closed position are powered using terminals 80a and 80b, leaving terminal 80c free. Valves in the normally open position are powered using terminals 80a and 80c, which leaves terminal 80b free.

The circuit 50 further includes a relay 82 in connection with the jumper 78 and the integral limit switch 81. The relay 82 includes a first set of terminals 84, a second set of terminals 85, and a third set of terminals 86. The first set of terminals 84 convey the position of the valve 16, supplied to the circuit 50 via the integral limit switch, to a monitoring device, such as security system 20 or smart home system 22. The second set of terminals 85 and the third set of terminals 86 both provide power to an indicator 87, such as an LED 87, and provide connections to the integral limit switch 16. The indicator 87 can be used to convey the position of the valve 16 to the user.

The operation of the circuit 50 will now be described. When open, primary input switches 58, 60, and 62 prevent power flow to activation relay 90. When any one of the primary input switches 58, 60, or 62 receive a primary input from, for example, the wall switch 18, security system 20, or smart home system 22, the particular switch 58, 60, or 62 closes. The closure of switch 58, 60, or 62 directs power to activation relay 90 thereby causing the activation relay 90 to trip and de-energize the valve 16 to arrest water flow. The LED's 75 visually indicate which primary input switch is activated and the LED 87 indicates that there is power to the valve 16. Because de-energizing the valve 16 closes the valve and arrests water flow, the LED 87 provides feedback to the operator indicating the position of the valve. The presence of LED 87 as a feedback mechanism is especially useful when the valve 16 does not have an integral limit switch 81.

When the primary input is from the security system 20 or the smart home system 22, the timer 36 may be used to delay the transfer of current from switch 60 or 62 to relay 90, thus delaying the energizing of valve 16. The period of time for which the current is delayed may be set to any suitable period of time according to user preference and the capabilities of the particular timer 36 used. The duration of the timer 36 may be altered by way of a variable time delay switch included within the timer 36. Any suitable timer 36 as is known to those skilled in the art may be used to provide the delay function.

The bypass circuit 38 is provided to process the above described secondary inputs from water utilizing devices 24 through 34. When a secondary input is received from devices 24, 26, 28, 30, 32 and/or 34, a corresponding switch is activated. For example, irrigation system 24 can activate switch 64, sump pump system 26 can activate switch 66, central humidification system 34 can activate switch 74, baseboard heat system 28 can activate switch 70, water softener system 30 can activate switch 72, and fire suppression system 32 can activate switch 68. Activation of any switch 64 through 74 causes a bypass relay 88 to trip, which causes power to bypass switches 58, 60, and 62. When the bypass 38 is activated, the activation relay 90 trips, and the valve 16 energizes so as to permit water flow to the water utilizing devices 24 through 34. Secondary LED's 76 visually indicate which secondary input switch resulted in the activation of the bypass circuit.

After the secondary input ceases, the bypass 38 and relay 88 both deactivate. If switches 64 through 74 are active, the relay 88 will again activate and cause valve 16 to be energized. If switches 64 through 74 are not active then relay 88 will not be activated and valve 16 will not be energized, thus preventing water to flow to the associated building.

Using the integral limit switch 81, the position of the valve 16 can be transmitted to the circuit 50. The status of the valve 16, such as whether it is open, closed, or at some point between being open or closed, can then be relayed to a user using a suitable device, such as either the security system 20 or the smart home system 22 via terminals 84 of the relay 82. The status of the valve 16 can also be conveyed to a user via an illuminated indicator 87. For example, the indicator 87 can illuminate when the valve 16 is energized, indicating that water flow is enabled, and can be dark when the valve 16 is not energized, indicating that water flow is restricted. Depending on the configuration of the circuit 50, this configuration can be reversed such that the indicator 87 illuminates when the valve 16 is de-energized, indicating that the valve 16 is closed and water flow is restricted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liquid flow mitigation system comprising:
   a systems interface;
   a liquid arresting mechanism operable to impede flow of a liquid;
   a control device operable to produce an input to said systems interface representing a request to impede flow of the liquid;
   a liquid utilizing device operable to produce an input to said systems interface representing a request for liquid flow;
   wherein said systems interface directs said liquid arresting mechanism to impede liquid flow when said systems interface is in receipt of an input from said control device; and
   wherein said systems interface directs said liquid arresting mechanism to permit liquid flow when said systems interface is in receipt of an input from said water utilizing device.

2. The liquid flow mitigation system of claim 1, further comprising a power supply.

3. The liquid flow mitigation system of claim 1, wherein said liquid arresting mechanism is at least one of a solenoid valve, a motorized ball valve, and a motorized gate valve.

4. The liquid flow mitigation system of claim 1, wherein said control device is at least one of a manual control switch, a security system, and a smart building system.

5. The liquid flow mitigation system of claim 1, wherein said liquid utilizing device is at least one of an irrigation system, a sump system, a baseboard heat system, a water softener system, a fire suppression system, and a central humidification system.

6. The liquid flow mitigation system of claim 1, wherein said systems interface further comprises a timer for delaying operation of said liquid arresting mechanism.

7. The liquid flow mitigation system of claim 1, wherein said liquid arresting mechanism is a 24V AC powered liquid arresting mechanism.

8. The liquid flow mitigation system of claim 1, wherein said liquid arresting mechanism is operable to provide feedback to at least one of said systems interface and said control device concerning the position of said liquid arresting mechanism.

9. The liquid flow mitigation system of claim 8, wherein said liquid arresting mechanism further comprises an integral limit switch operable to provide feedback to at least one of said systems interface and said control device concerning the position of said liquid arresting mechanism.

10. The liquid flow mitigation system of claim 8, further comprising a visual indicator operable to alert a user as to the position of said liquid arresting mechanism.

11. A water flow mitigation system comprising:
    a systems interface;
    a water regulation device operable to impede water flow and operable to notify said systems interface as to the position of said water regulation device;
    a control device operable to provide an input to said systems interface representative of a request to restrict water flow;
    a water utilizing device operable to provide an input to said systems interface representative of a request for water flow;
    wherein said systems interface commands said water regulation device to impede water flow when said systems interface is in receipt of an input from said control device;
    wherein said systems interface commands said water regulation device to permit water flow when said systems interface is in receipt of an input from said water utilizing device; and
    wherein said water regulation device provides feedback to said systems interface concerning the position of said water regulation device.

12. The water flow mitigation system of claim 11, wherein said water regulation device further comprises an integral limit switch operable to provide an input to said systems interface to indicate the position of said water regulation device.

13. The water flow mitigation system of claim 11, wherein said systems interface indicates the position of said water regulation device to a user by way of said control device.

14. The water flow mitigation system of claim 11, further comprising a visual indicator operable to notify a user as to the position of said water regulation device.

15. The water flow mitigation system of claim 11, wherein said water regulation device is at least one of a solenoid valve, a motorized ball valve, and a motorized gate valve.

16. The water flow mitigation system of claim 11, wherein said control device is at least one of a manual control switch, a security system, and a smart building system.

17. The water flow mitigation system of claim 11, wherein said water utilizing device is at least one of an irrigation system, a sump system, a baseboard heat system, a water softener system, a fire suppression system, and a central humidification system.

18. The water flow mitigation system of claim 11, wherein said water regulation device is a 24V AC water regulation device.

19. A water flow mitigation method comprising:
    transferring a water arresting command from a control device to a systems interface to request the systems interface to restrict water flow;
    setting a water flow regulation device to restrict water flow in response receipt of the water arresting command by the systems interface;
    transferring a water request command from a water utilizing device to the systems interface to request the systems interface to permit water flow;
    setting the water flow regulation device to permit water flow in response to receipt of the water request command by the systems interface; and
    providing feedback to a user concerning the position of the water flow regulation device through at least one of a visual indicator and the control device.

20. The method of claim 19, wherein the setting the water flow regulation device steps include setting at least one of a solenoid valve, a motorized ball valve, and a motorized gate valve.

* * * * *